March 3, 1959
L. J. BISHOP ET AL
2,875,703
POWER AND FREE CONVEYOR SYSTEM
Filed Oct. 30, 1956
11 Sheets-Sheet 2
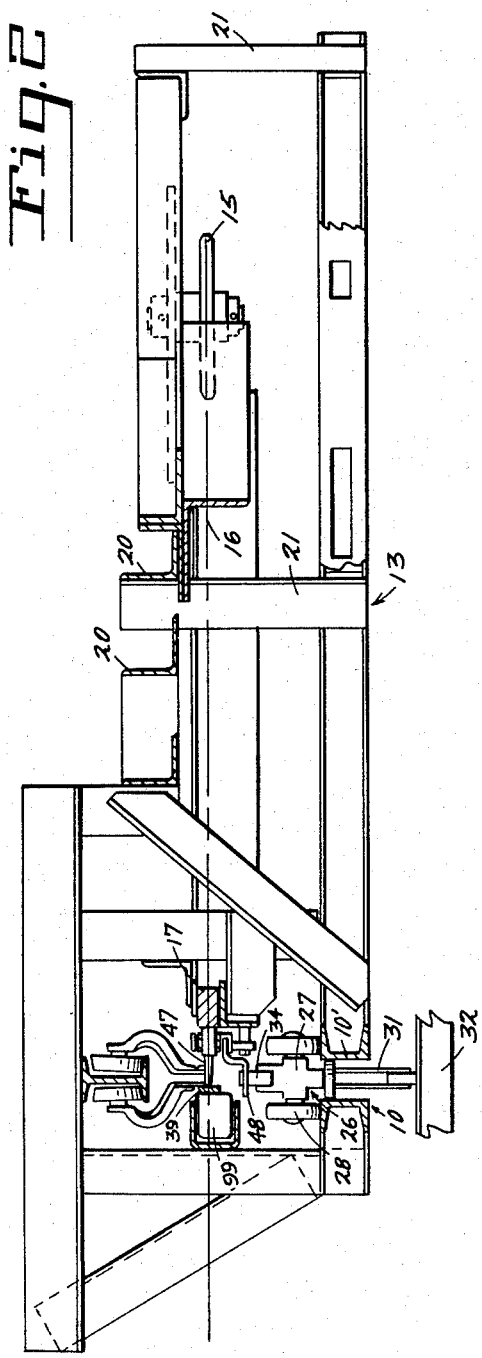
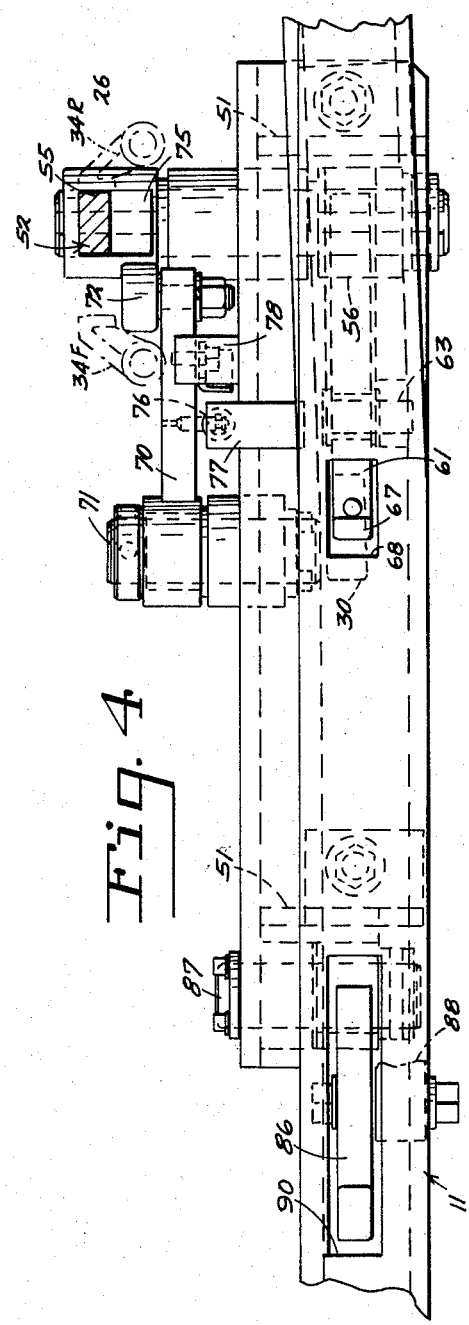
INVENTORS.
LEONARD J. BISHOP
JOEL H. BARLOW.
BY March 3, 1959 L. J. BISHOP ET AL 2,875,703
POWER AND FREE CONVEYOR SYSTEM
Filed Oct. 30, 1956 11 Sheets-Sheet 3

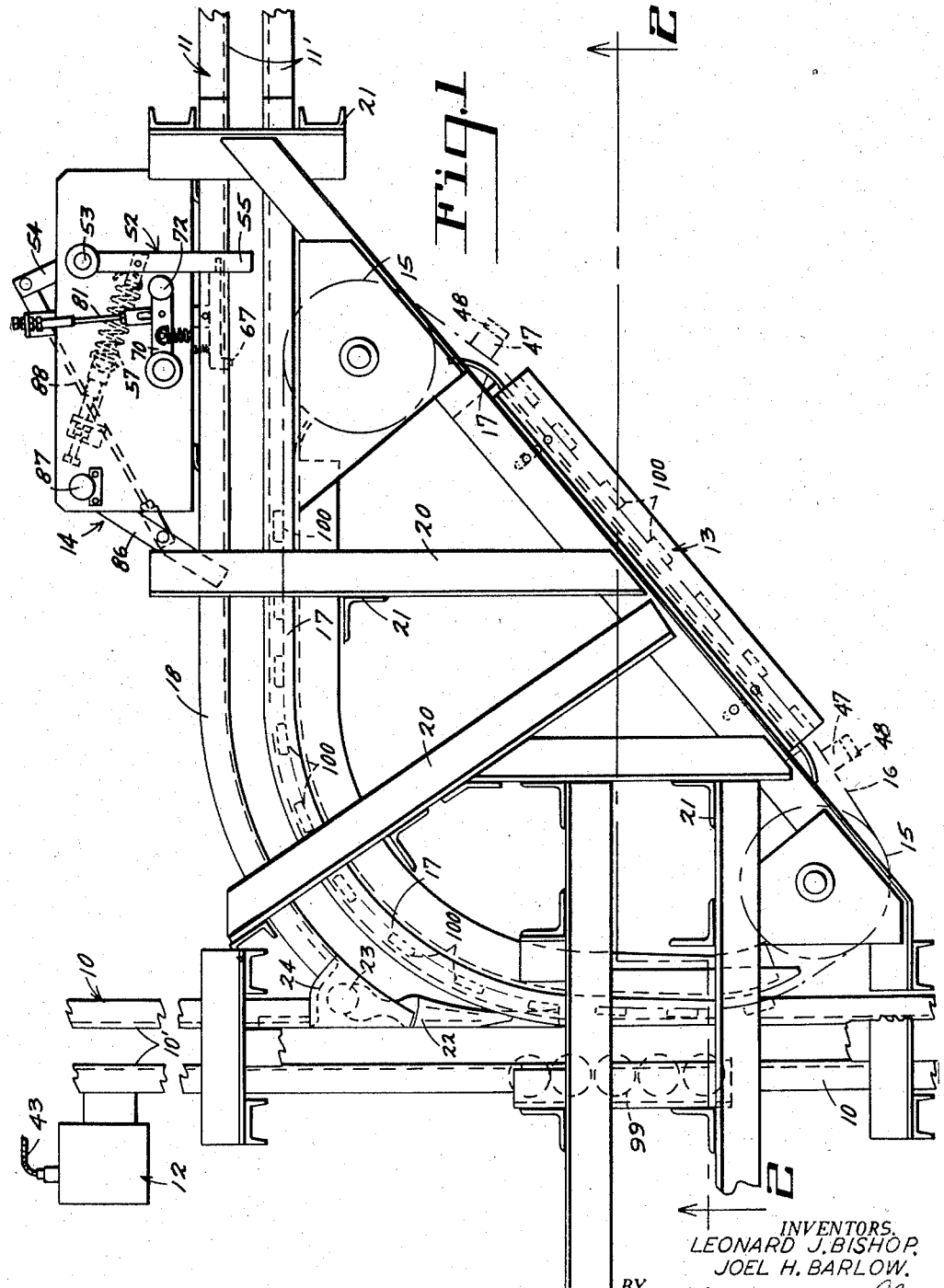

INVENTORS
LEONARD J. BISHOP
JOEL H. BARLOW
BY Whittemore, Hulbert &
Belknap

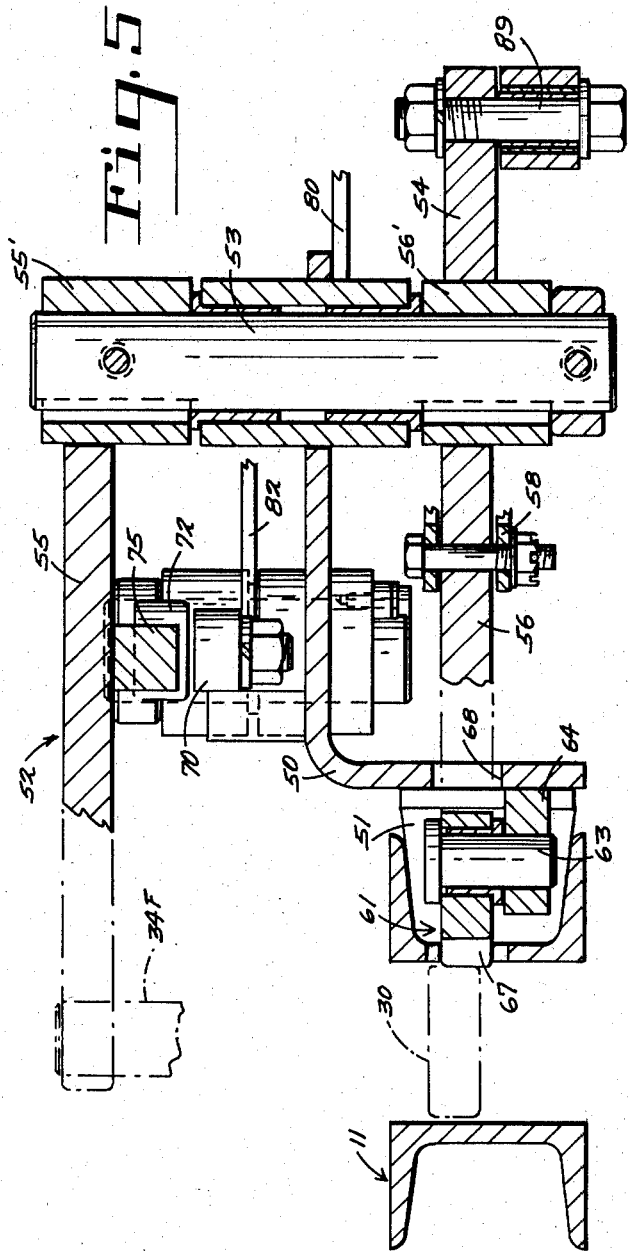

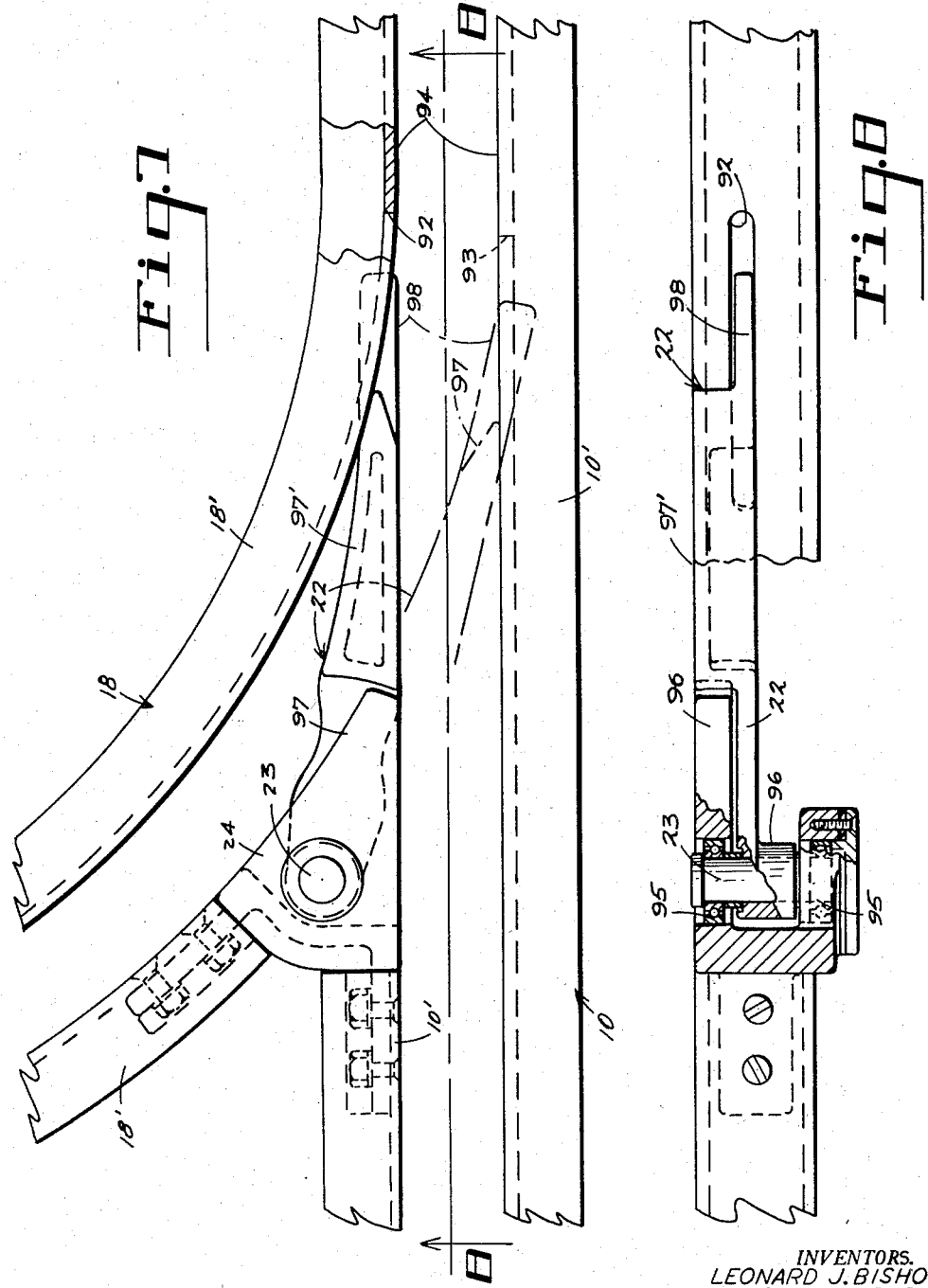

March 3, 1959

L. J. BISHOP ET AL 2,875,703

POWER AND FREE CONVEYOR SYSTEM

Filed Oct. 30, 1956

INVENTORS.
LEONARD J. BISHOP,
JOEL H. BARLOW.
BY Whittemore Halbert &
Belknap

March 3, 1959  L. J. BISHOP ET AL  2,875,703
POWER AND FREE CONVEYOR SYSTEM
Filed Oct. 30, 1956  11 Sheets-Sheet 8

INVENTORS.
LEONARD J. BISHOP
JOEL H. BARLOW.
BY *Whittemore, Hulbert*
*Belknap*

LEONARD J. BISHOP.
JOEL H. BARLOW.
INVENTORS.

March 3, 1959 L. J. BISHOP ET AL 2,875,703
POWER AND FREE CONVEYOR SYSTEM
Filed Oct. 30, 1956 11 Sheets-Sheet 10

LEONARD J. BISHOP.
JOEL H. BARLOW.
INVENTORS.

BY Whittemore, Hulbert
Belknap

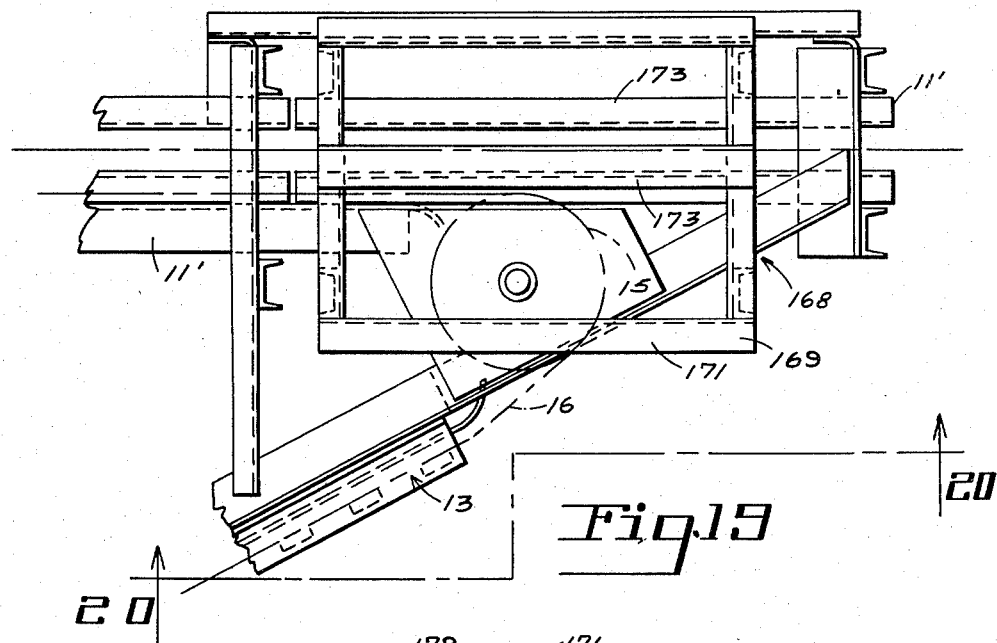
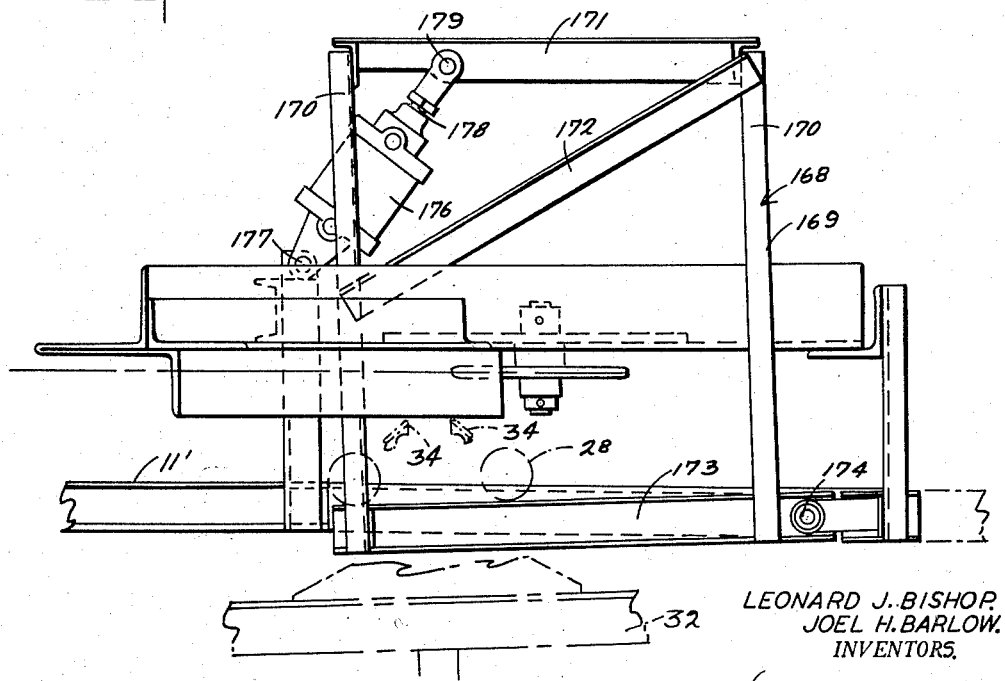

United States Patent Office 2,875,703
Patented Mar. 3, 1959

2,875,703

POWER AND FREE CONVEYOR SYSTEM

Leonard J. Bishop, Birmingham, and Joel H. Barlow, Detroit, Mich., assignors to Mechanical Handling Systems, Inc., Detroit, Mich., a corporation of Michigan Application October 30, 1956, Serial No. 619,249

8 Claims. (Cl. 104—96)

The present invention relates to an improved power and free type conveyor system such as is illustrated and described in the copending application of Leonard J. Bishop and Paul Klamp, Serial No. 513,452, filed June 6, 1955. More particularly, the invention deals with an entrance switch mechanism for transferring loaded overhead trolleys traversing a branch track under gravitational motivation onto a main track which converges at 90° with the branch track, in accurately and unfailingly timed relation to a trolley advancing conveyor traveling in the direction of the main track. Thereby insurance is had that a trolley will be delivered from the branch to the main track only when an advancing member of said last named conveyor is in position to receive and further advance the branch track trolley being unencumbered at this time.

It is a general object of the invention to provide an entry switch mechanism of the foregoing character, in which a trolley traversing the branch track is transferred onto the main track by a continuously traveling transfer chain adjacent the junction of the branch and main tracks and, more particularly, in which the entrance switch mechanism involves a control device or unit acting to halt the branch track trolley where it, or one of its components, is out of a position to be engaged and forwarded by the transfer conveyor onto the main track, until the condition is proper for the branch track trolley to be received and advanced by a main track trolley driving dog. This condition exists only when the last named dog is not already drivingly engaged with a trolley on the main track; and the condition is signaled to the branch track control unit or device by signal or control stations or members located respectively adjacent the main and branch tracks of the system.

Another general object is to provide a mechanism as described, in which the entrance switch mechanism comprises an endless transfer conveyor which is positively driven in a horizontal plane under positive driving engagement with the main track trolley advancing conveyor, having trolley engaging dogs which are thus driven in accurate, predeterminedly timed relation to the travel of trolley advancing members on the main track conveyor. By this arrangement the main conveyor trolley advancing members may be arranged in closely spaced longitudinal sequence; and the transfer conveyor, upon appropriate signal from the main track in advance of the zone of its convergence with the branch track, will accurately and unfailingly deliver a branch track trolley to this zone of convergence and into the path of the main conveyor trolley advance members. This delivery is, due to the driving relationship of the two conveyors, always made slightly in advance of an approaching main conveyor member; and there is no possibility of jamming of a transfer conveyor trolley and its load with a load on the main conveyor at the point of delivery.

A further object is to provide an entrance switch mechanism for an overhead conveyor system or apparatus, in which a control unit of the mechanism is incapable of placing a branch track trolley in position for driving engagement by the transfer conveyor unless a mechanical signal indicating the presence of a halted trolley on the branch track, adjacent the entrance switch mechanism, is originated prior to or simultaneously with the origination of a mechanical signal indicating the approach of a main track conveyor dog, unoccupied by a trolley on the main track, toward the switch mechanism.

It is a still further and more specific object of the invention to provide an entrance switch mechanism in which the operations described in the preceding paragraph may be accomplished in different ways, in accordance with different mechanical embodiments hereinafter described, i. e. by halting the branch track trolley and then physically and bodily advancing the same longitudinally along the branch track into position to be picked up by the transfer conveyor; by preventing engagement of the transfer conveyor with the halted branch track trolley through the expedient of shifting the usual conveyor engaged dogs of the trolley out of the plane of advance of driving dogs on the transfer conveyor; and by bodily shifting the branch track trolley as a whole out of the path of advance of the transfer conveyor dogs, upon arrival and halting at a branch track control or signal station, whether the bodily shift of the trolley is effected in a horizontal or a vertical direction.

In accordance with another object, the invention provides an entry switch mechanism in which, following operation of a branch track signal or control station or unit to place a branch track trolley in position or condition for engagement and advance by the transfer conveyor, the advanced trolley is capable of restoring the station or unit to its original position, ready to intercept a succeeding trolley traversing a branch track.

A basic object of the invention is to provide a conveyor system involving a power driven main conveyor and provisions to transfer a trolley or like load support between a branch conveyor track and a reach of a main conveyor track, in which all such provisions, such as a transfer conveyor and an entrance switch unit as herein described, derive their power from a common source, i. e., the main conveyor and its basic drive means.

Another general object of the invention is to provide an entry switch and transfer mechanism of the sort described above, in which all operating, control and operated components are mechanical in nature, being extremely rugged, as well as reliable and foolproof, so as to require little or no attention. A system of this sort is very economically produced and installed, as compared with pneumatically, hydraulically and electrically operated installations, in addition to being reliable and foolproof, as pointed out above.

The foregoing as well as other objects will be made more apparent as this description proceeds, especially when considered in connection with the accompanying drawings, wherein:

Fig. 1 is a fragmentary top plan view of the improved entrance switch and transfer mechanism in one embodiment thereof, indicating in a general way the relationship of major components;

Fig. 2 is a fragmentary view in vertical section along the broken line 2—2 of Fig. 1;

Figure 3:
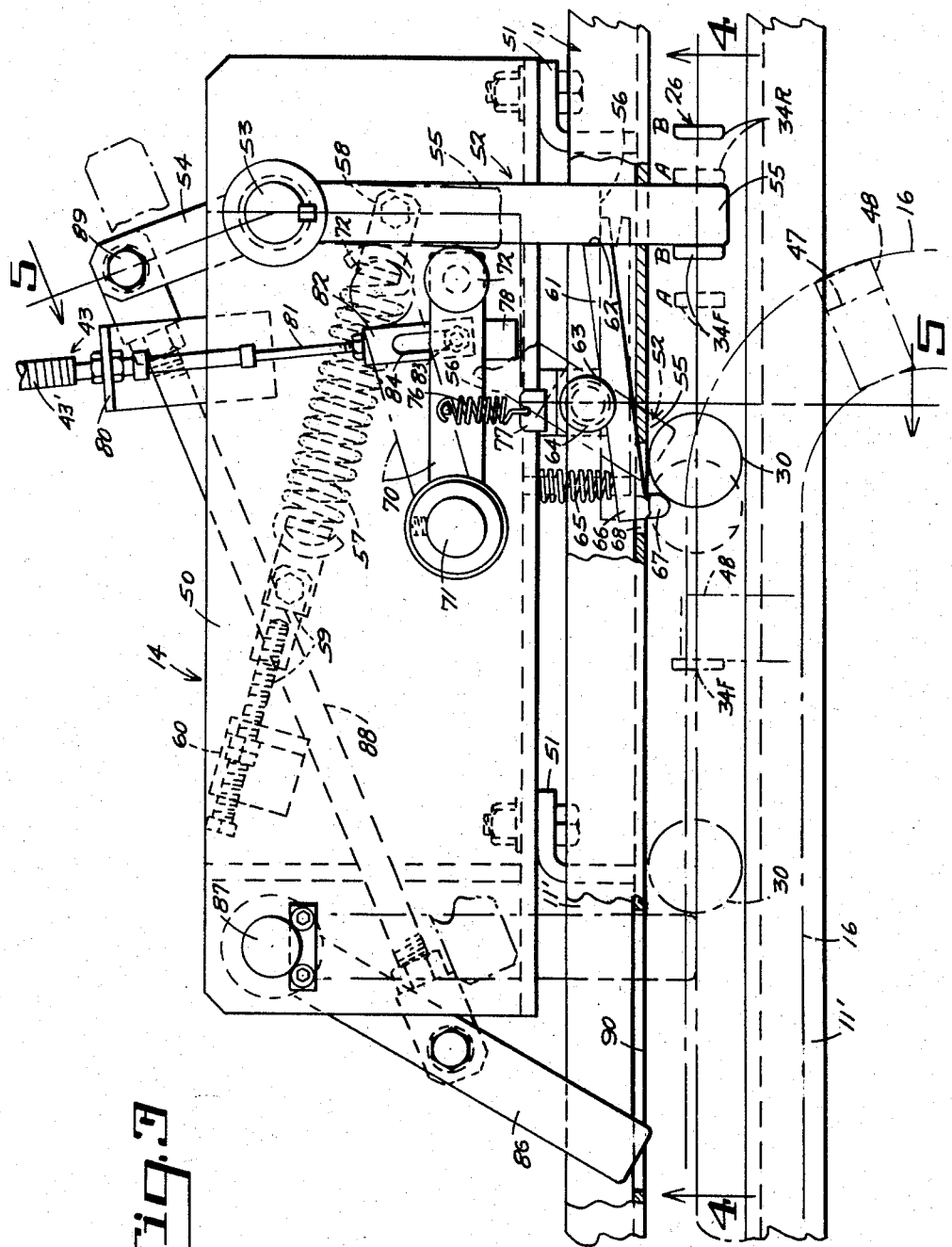
Fig. 3 is a fragmentary plan view in enlarged scale, also partially broken away and in horizontal section, illustrating the arrangement and operation of an automatic control or kick feeder unit of the mechanism of Fig. 1, operating parts being shown in solid and dotted lines, and trolley parts in dot-dash line, in different operating positions.
Figure 6:
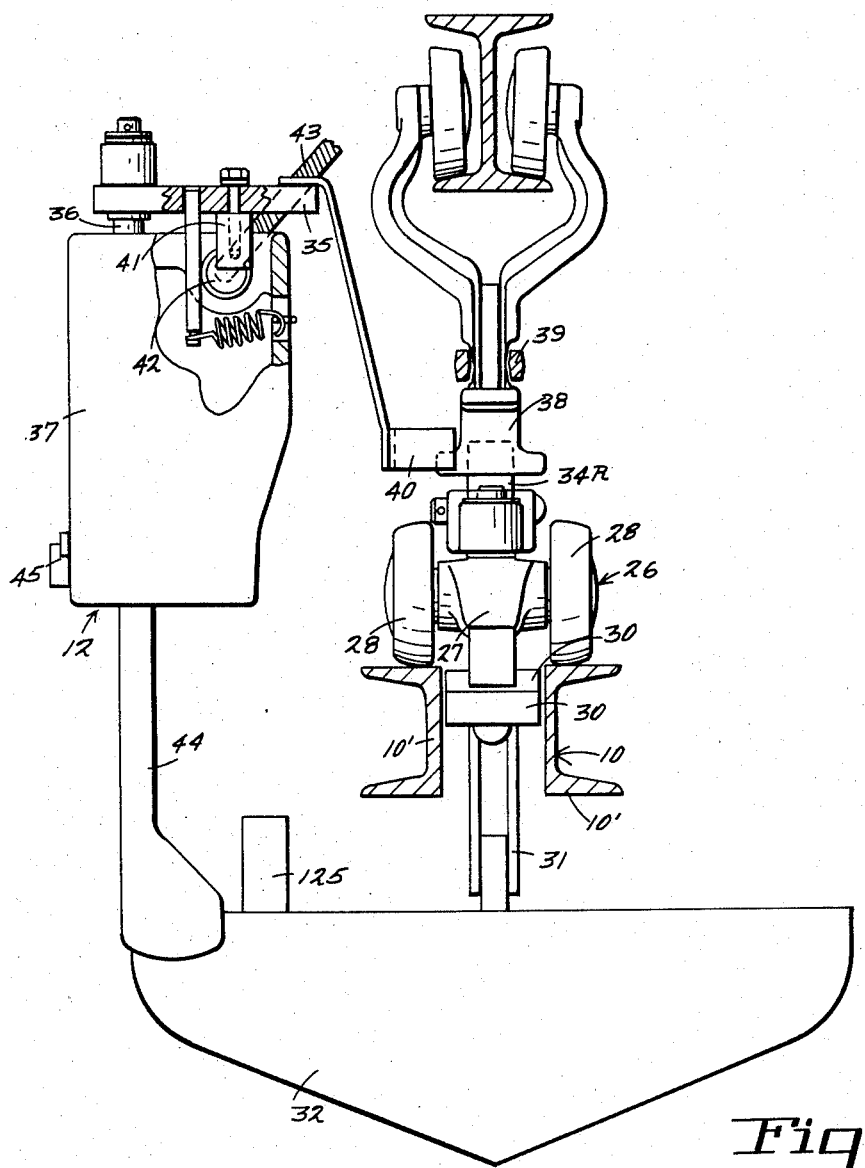
Figure 9:
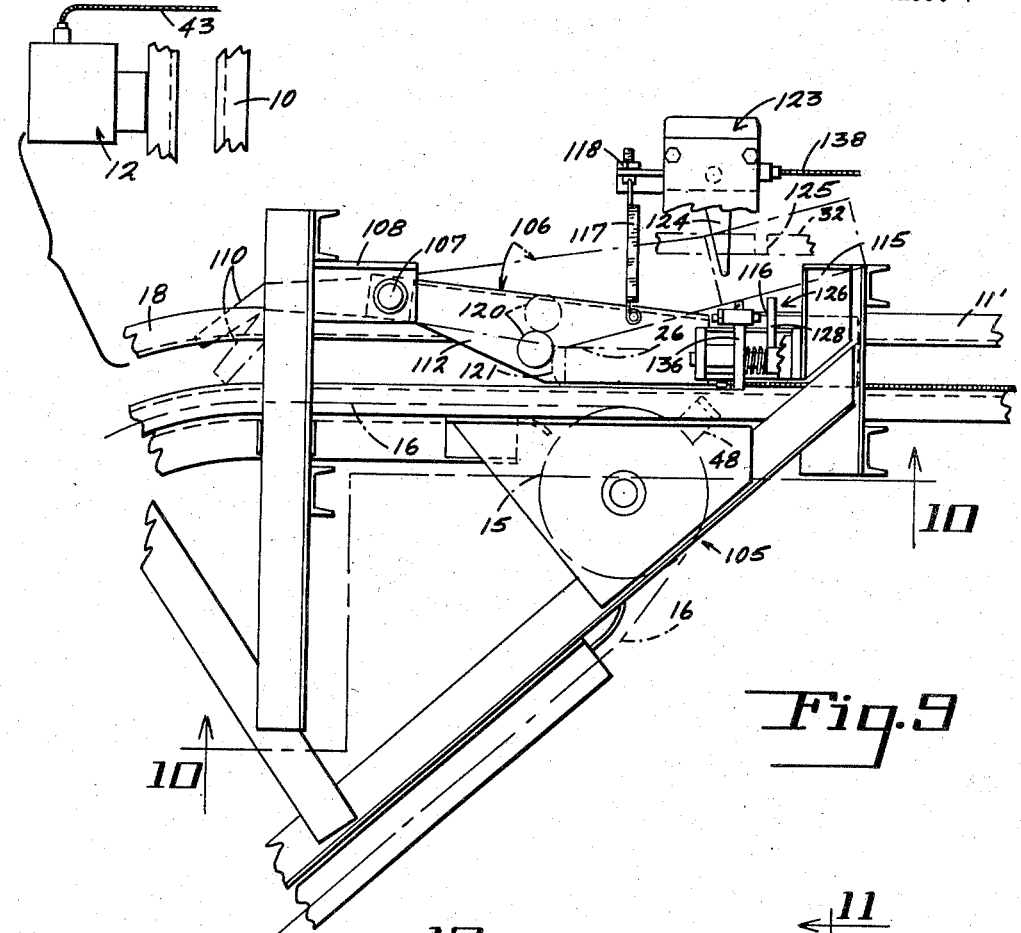
Figure 10:
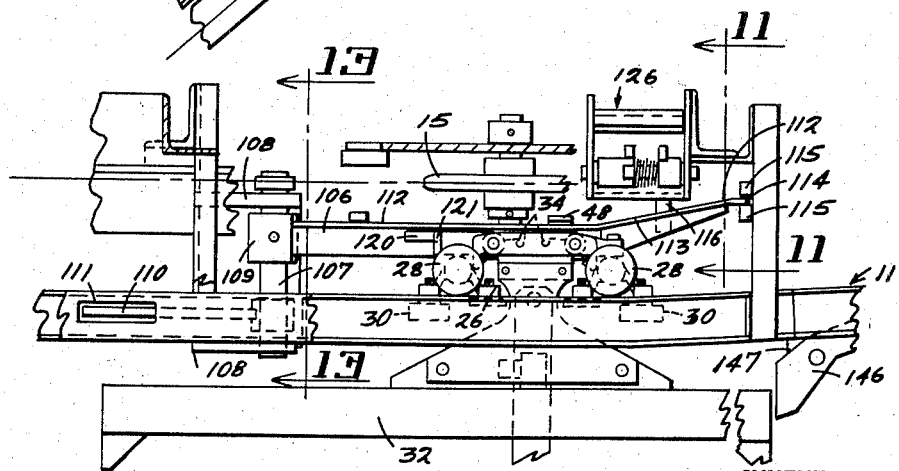
Figure 11:
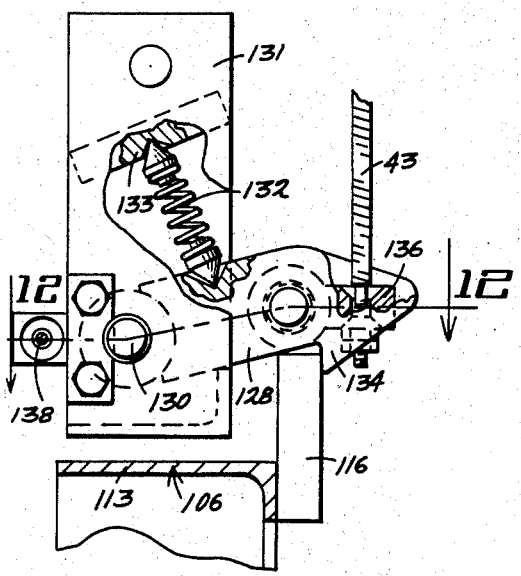
Figure 12:
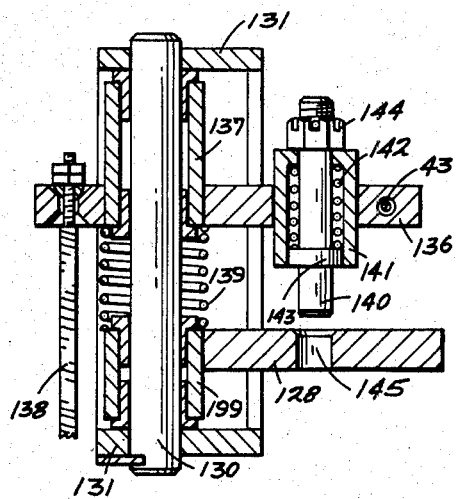
Figure 13:
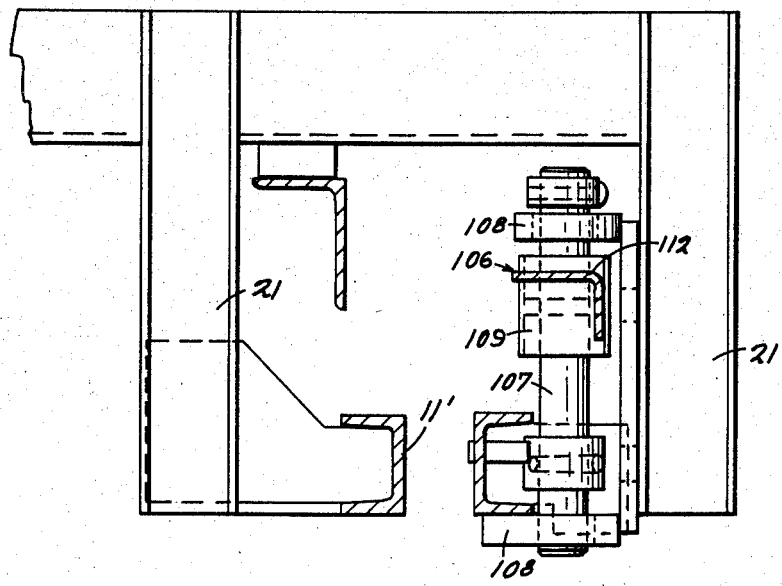
Figure 14:
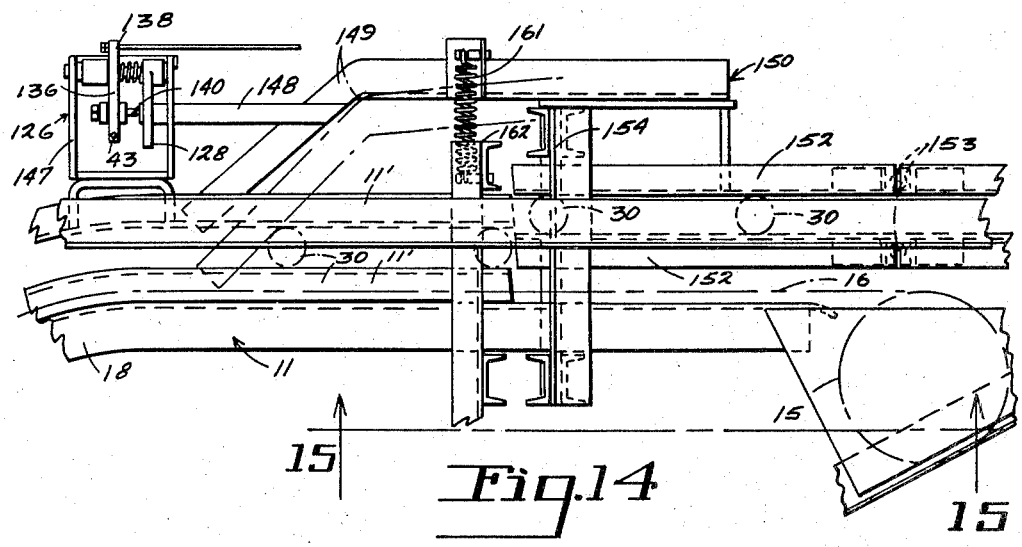
Figure 15:
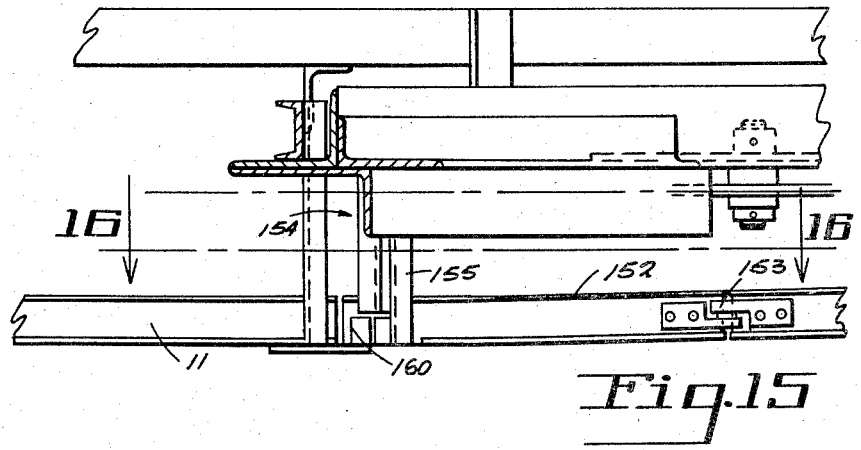
Figure 16:
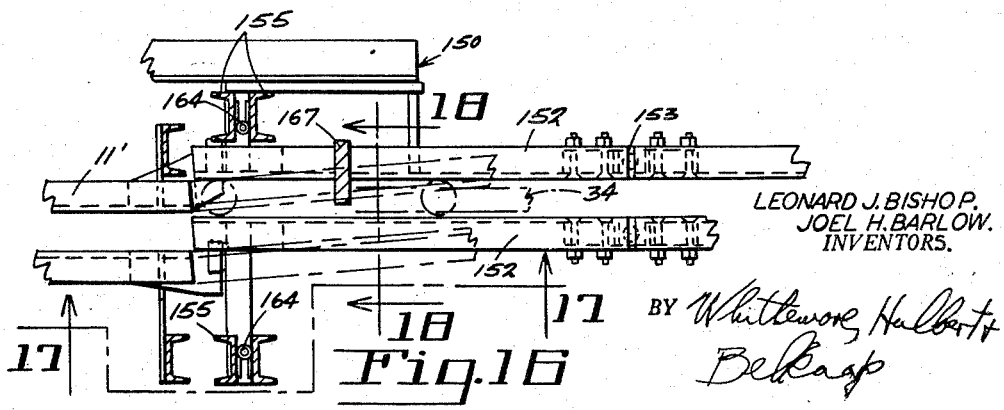
Figures 17, 18:
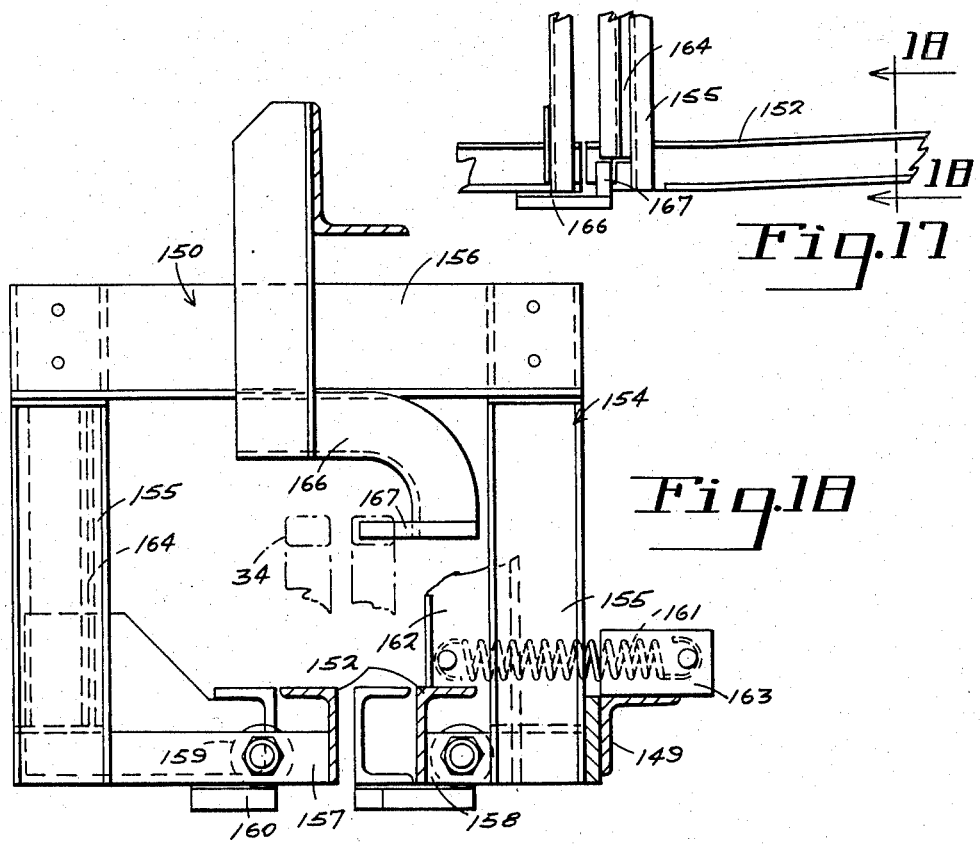

Figs. 4 and 5 are, respectively, fragmentary views in vertical section along the lines 4—4 and 5—5 of Fig. 3, showing further structural details of the kick feeder type control unit, parts of the controlled branch track trolley being indicated in dot-dash line;

Fig. 6 is a view in end elevation, partially broken away and in vertical section, showing a main track signal station in part controlling the operation of the mechanism;

Fig. 7 is a fragmentary top plan view, partially broken away and horizontally sectioned, of an improved track tongue subassembly of the entrance switch mechanism;

Fig. 8 is a fragmentary view in side elevation, also partially broken away and in vertical section, of the tongue structure of Fig. 7;

Fig. 9 is a fragmentary top plan view illustrating a modified embodiment of the entry switch mechanism;

Fig. 10 is a fragmentary view in vertical section along line 10—10 of Fig. 9;

Fig. 11 is a view in side elevation, partially broken away and in vertical section, of a latch unit of the embodiment of Figs. 9 and 10, as viewed from line 11—11 of Fig. 10;

Fig. 12 is a view in section along line 12—12 of Fig. 11;

Fig. 13 is a view in vertical section along line 13—13 of Fig. 10;

Fig. 14 is a fragmentary top plan view of a further modified adaptation of the principle of the invention;

Fig. 15 is a fragmentary view in vertical section along line 15—15 of Fig. 14;

Fig. 16 is a fragmentary view in horizontal section along line 16—16 of Fig. 15;

Fig. 17 is a fragmentary front elevational view from line 17—17 of Fig. 16;

Fig. 18 is a view in vertical section along line 18—18 of Figs. 16 and 17, different positions of trolley dogs controlled by the mechanism being indicated in solid and dotted lines;

Fig. 19 is a top plan view of a still further modified form of the entry switch mechanism; and Fig. 20 is a fragmentary view in vertical section along line 20—20 of Fig. 19.

Fig. 1 of the drawings shows the general layout of the entrance switch and kick feed control and transfer assembly in accordance with one embodiment of the invention, and Figs. 2 through 8 illustrate other and more detailed features thereof. The reference numeral 10 generally designates a main trolley supporting track reach of an overhead conveyor system of the power and free type, such as forms the subject matter of the copending application, Serial No. 513,452, identified above, while the reference numeral 11 generally designates a branch track into which conveyor trolleys are diverted from another reach (not shown) of main track 10, as by means of an exit switch mechanism of the type shown and described in my copending application, Serial No. 601,001 filed July 30, 1956. The conveyor trolleys are advanced on any reach of the main track 10 by an overhead, powered trolley drive chain, as hereinafter referred to, and in traversing the branch track 11 the trolleys will be motivated by gravity due to a slight inclination of that track toward the main track reach 10 shown in the drawings. Opposed channel members which constitute the tracks 10 and 11 are designated by corresponding reference numeral, primed.

The reference numeral 12 generally designates a signal or control station or unit appropriately mounted in fixed relation to the main track reach 10; the reference numeral 13 generally designates a transfer conveyor of the mechanism, by which branch track trolleys are forwarded to the powered trolley drive chain approaching in the direction of the track 10; and the switch mechanism also includes an improved kick feeder unit, generally designated 14, which coacts with the transfer conveyor 13 in a manner to be described.

The conveyor 13 includes vertically journaled driving sprockets 15, about which a continuous conveyor chain 16 is trained, this chain being guided by conventional track or way provisions, generally designated 17. These provisions guide chain 16 in a roughly triangular path, including an arcuate segment adjoining a transfer section 18 of curved track structure by which the branch track 11 is connected with the main track 10. All of these track and guide provisions, as well as the signal station 12, the kick feed unit 14, and the like are appropriately supported by horizontal and vertical beams 20, 21, respectively, of the overhead conveyor mounting structure, which is conventional.

Further in accordance with standard practice, a swing-entrance switch tongue or frog 22 is mounted on a vertical pivot 23 at a cast connector 24 located at the junction of the respective main and switch track portions 10 and 18, to which connector the respective tracks are bolted. A specific improvement in accordance with the invention, constituting the subject matter of a divisional application, deals with provisions for sustaining without deflection the weight of a loaded trolley traversing the tongue 22 at the switch zone, whether the latter is in the position illustrated in Fig. 1, in which track 10 is open across the switch zone, or in its other position, in which the switch transfer track 18 opens to the main track. This improvement will be hereinafter described in greater detail.

Reference may be had to Figs. 2 and 6, in conjunction with Fig. 1 for necessary details of the trolley construction and its main track drive means, which are entirely conventional, as well as the arrangements at the main track signal unit or station 12. The latter is schematically shown in Fig. 1, and only in sufficient detail in Fig. 6 to permit an understanding of its operation in relation to what is shown in the remainder of the figures.

The trolley, generally designated 26, comprises a frame 27 equipped with pairs of front and rear track wheels or rollers 28. The rollers 28 ride on the top flanges of the track channels 10', 11' of the respective main and branch tracks 10 and 11, and the trolley is equipped with depending forward and rearward guide rollers 30 which travel in the space between the webs of these track elements. The forward guide roller 30, which is at a lower elevation than the rearward, serves as a switch control element in the operation of the mechanism.

A hanger 31 depending from the trolley supports the usual bumper 32 of the individual load-carrying support. For the purpose of this description the hanger 31 and bumper 32 may be considered to be parts of the trolley 26, since bumper 32 is also employed in the operation of a main track signal unit or device 12 (to be described) to signal the presence of a trolley being impelled on main track reach 10. In accordance with the usual practice, and as shown in the copending applications identified above, each trolley 26 carries pivoted and counterweighted front and rear drive dogs 34, by which its advance on main track 10 is effected, as well as by which its traverse through the present entry switch is controlled. For clarity the front and rear trolley dogs 34 are further denoted respectively by the characters "F" and "R" in Figs. 3 through 6 of the drawings. These trolley parts are also involved in the operation of the branch track transfer control device including unit 14 (to be described).

With reference to the signal station or unit 12 (Fig. 6), it suffices to point out that it includes an actuating arm 35 secured on a vertical shaft 36 appropriately journaled in the signal unit housing 37. When this arm is actuated by the engagement of a driving dog or lug 38 on a main, trolley sustained conveyor driving chain 39 with a tappet extension 40 of arm 35, a lug 41 on the arm drives a rod 42, guided within the housing 37, for a short longitudinal stroke. A flexible cable connector 43 of the Bowden type, secured to the rod 42, extends from the housing 37 and is connected to the kick feeder unit 14 of the present invention to operate the same in a manner to be described when cable 43 is tensioned. Such operation occurs when a driving lug 38 on main drive chain 39 strikes tappet extension 40, and, moreover when the lug 41 on arm 35 can make an operating engagement with rod 42.

This happens when no trolley 26 is being advanced on main track 10 by the conveyor lug 38 in question. If the operating arm 35 is elevated predeterminedly from the position shown in Fig. 6, it fails to make contact with the rod 42 and the flexible cable 43 is not actuated. The arm 35 is elevated in this manner by elevating the shaft 36 to which it is secured, and this is accomplished by the engagement of a suspended bumper 32 of a trolley 26 with a signal control arm 44 of unit 12. The arm 44 swings on a pivot 45 extending into the housing 37, and has an upper cam portion (not shown) which engages the shaft 36 to elevate it. Reference may be had to the identified copending application, Serial No. 513,452, for further details of the station or unit 12.

It follows from the above description that, if the main conveyor driving chain 39 is advancing a trolley 26 and its bumper 32, the latter will strike the signal arm 44, with the result that the flexible cable 43 will not be tensioned to forward a mechanical signal to the kick feed unit 14, as it would if no trolley were driven by the chain lug 38 as it arrived at signal station 12. Thus the kick feeder will not forward a trolley to the main track 10, and resultant interference and jamming with the main track trolley is avoided. A lug or dog 38 on the power chain 39 which is not driving a trolley will operate the arm extension tappet 40, forwarding the mechanical signal which in part sets the kick feed unit 14 up for operation.

The transfer conveyor chain 16 is provided with longitudinally spaced, outwardly projecting drive lugs or dogs designated 47 in Figs. 1 and 2 and schematically indicated in Fig. 3, which depicts in dot-dash line the path of travel of the dogs. These dogs 47 are driven in caterpillar fashion by the links of the main conveyor drive chain 39.

As illustrated in Fig. 2, the transfer conveyor chain 16 also carries a series of trolley pick up lugs or dogs 48. These lugs 48 are adapted to be positioned between the forward and rearward trolley drive dogs 34 under the control of the kick feed unit 14.

A trolley 26 thus picked up at the branch conveyor track 11 by a dog 48 and transported by chain 16 about the arcuate connecting segment 18 will, under the control of the unit 14, always be delivered in proper relation to the main track driving chain 39, to be forwarded by it along the main track 10 extension. The caterpillar driving engagement of the transfer conveyor lugs 47 with the links of the main drive chain 39, as illustrated in Fig. 2, assures an accurately timed drive of the transfer conveyor 16 and its trolley advancing dogs 48 in relation to the travel of pusher dogs 38 of the main conveyor (Fig. 6). In engaging the dogs 34 of the trolleys, during advance into and departure from the zone of convergence of the main and branch conveyor tracks, the respective main and transfer conveyor dogs 38, 48 travel in a common horizontal plane. The dogs 48 are enabled, due to the positively synchronized driving relationship, to deliver the trolleys to the transfer zone in an unfailingly and accurately timed way, with the trolley dogs 34 directly in the path of and slightly forwardly of an approachinng main conveyor dog 38. This is on the assumption that a trolley is present on the branch track in approximate position to be so picked up. It is therefore the function of the kick feeder unit 14 to insure that this is always the case.

Referring now to Figs. 3, 4 and 5 for structural details of the unit 14, its operating instrumentalities are supported in a bracket plate 50 rigidly secured by appropriate mounting provisions, as the brackets 51, to the hanger or like structure 20, 21 which sustains the branch track 11. As indicated in Fig. 1, the unit 14 is located on the opposite side of branch track 11 from the rearmost switch chain sprocket 15, in reference to the travel of the trolleys 26 on the branch track.

The kick feed unit 14 comprises a dual function latch and kick feed lever, generally designated 52, secured on an upright pivot stud 53 journaled on bracket plate 50, this lever having an outwardly projecting reset arm 54 also secured to and projecting from the stud 53 beneath the plate 50. The function of the arm 54 will be hereinafter referred to.

The lever 52 includes a relatively elongated trolley stop and kick feed arm 55 which is secured by a hub 55' on stud 53 and extends inwardly across one of the track sections 11' of the branch track 11, terminating somewhat past the center line of the space between the sections. In vertically downwardly spaced relation to the arm 55 the lever 52 also includes a shorter latch arm 56 which, as shown in Fig. 5, is fixed to the pivot stud 53 by a hub 56', hence rotates as a unit with the stop and kick feed arm 55. Actually, the reset arm 54 of lever 52, of which the arms 55 and 56 are parts, is an extension of the latch arm 56. The lever unit 52 is urged in clockwise direction by a relatively strong coil spring 57 (Fig. 3) connected at one end to the latch lever arm 56, hence to the lever unit as a whole, by a forked yoke 58. At its opposite end the spring 53 is anchored through the agency of an adjustable coupling 59 to a bracket element 60 which is fixedly mounted on the lower surface of bracket plate 50.

In the condition of the kick feed unit 14 shown in Fig. 3 of the drawings, i. e. prior to the arrival of a trolley 26 at the kick feed station, the latch and kick feed lever 52 is held, as shown in solid line, by means of a trip arm 61. The arm 61 has a notched end affording a stop shoulder 62 to engage a side of the free end of latch arm 56 of the dual function lever 52. The latch arm 61 pivots on an upright stud 63 (Fig. 5) which is mounted on a bracket element 64 affixed to the bracket plate 50 adjacent a side of the branch track 11. A coil compression spring 65 acts between the bracket plate 50 and an extension arm 66 of latch lever 61 to urge the latter in counterclockwise direction and thus hold the arm 61 in latching position, with its notched shoulder end abutting the end of the latch arm 56 of lever 52. Latch arm extension 66 has a nose 67 which projects through an aperture 68 in the adjacent track section. In this position the nose 67, like the extremity of trolley stop and kick arm 55 of lever 52, may be engaged by an advancing trolley, as will be hereinafter described, to actuate the arm 61 from the solid to the dotted line positions thereof. This frees the shoulder 62 of arm 61 from the arm 56, whereupon power spring 57 swings lever unit 52 slightly clockwise (Fig. 3) to the position shown in dot-dash line (only a portion of lever arm 55 appearing in this position). Thus the lever unit 52 is readied for a full, spring-powered kick stroke.

However, the lever 52 is prevented from making this full kick stroke until a signal is received from the main track signal unit or station 12. Until such main track signal is received the kick feed arm 55 is held in the cocked or preliminarily tripped position shown in dot-dash line in Fig. 3 by a detent or stop arm 70 pivoted on an upright post 71 on the bracket plate 50. At its outer end, the detent arm 70 carries an anti-friction roller 72 which, in the position of the parts shown in Fig. 3, abuts a stop lug 75 (see Figs. 4 and 5) welded to the lower surface of the upper, stop and kick feed lever arm 55 at a medial point along the length of the latter. The detent arm 70 is urged in clockwise direction, as viewed in Figs. 1 and 3, by means of a coil return spring 76 anchored to a bracket element 77 on plate 50, and the movement of the arm in this direction is limited by stop lug 78 welded to the bracket plate.

Upon receipt of a signal from the main track unit 12, the detent arm 70 is swung (by means to be described) from the solid line position of Fig. 3 to its dotted line position, out of engagement with the stop lug 75 on kick lever unit 52. This releases the lever unit, causing it to be urged by power spring 57 from its solid line position to its dotted line position in a kick feed stroke, as will be described.

The detent arm 70 is shifted counterclockwise from its solid to its dotted line position by the flexible cable 43, which extends from the kick feed unit 14 to the main track signal station 12, being connected to the latter in the manner described above. The end of the sheath 43' of cable 43 is anchored to a bracket extension 80 fixed on the bracket plate 50, and the moving tension wire 81 of the cable 43 is connected to detent arm 70 by an adjustable coupling or connector 82. In this connection the arm 70 has a fixed bolt or stud 83 thereon which is received in an elongated slot 84 of the coupling element 82. Thus, the cable tension element 81 is effective to pull the detent arm 70 and release the kick feed lever 52, and upon release of tension and return of the wire the stud 83 has a lost motion return in the slot 84. The arm 70 is swung back to the solid line position of Fig. 3 by its return spring 76, once the trolley stop and kick feed lever 52 has been returned to its original solid line position by the reset provisions now to be described. Prior to such return, the follower roller 72 rests against a side face of the lever arm lug 75, being urged thereagainst by the spring 76.

The reset provisions referred to above comprise a reset lever 86 swingable about a fixed upright pivot 87 on bracket plate 50. The lever 86 is pivotally connected medially of its length with an elongated, adjustable connecting or draw rod 88 extending beneath the bracket plate 50 and pivotally connected adjacent its opposite end at 89 to the outer extremity of the reset arm extension 54 of the stop and kick feed lever unit 52.

The free end of reset lever 86 is adapted to extend through an elongated side opening 90 in the adjacent section of track 11, in which it travels from the dotted line position to the solid line position, and vice versa. With the linkage described, the clockwise swing of lever unit 52 on the power kick stroke (Fig. 3) causes reset lever 86 to swing counterclockwise to the dotted line position. In the dotted line position it extends across track 11 and is engaged by the forward trolley roller 30 as the trolley is kicked forward to this position by the lever arm 55. Reset lever 86 thus acts as a trolley positioning stop. When the trolley becomes engaged by a trolley feed dog or lug 48 on the transfer conveyor chain 16 it is pushed forward by the lug, causing the reset lever 86 to swing clockwise from the dotted line to the solid line position of Fig. 3. This moves the connecting rod 88, which in turn causes the reset arm 54 and kick feed lever and latch unit 52 to be swung counterclockwise and return to their solid line positions of Fig. 3, whereupon the arm 56 of lever unit 52 is latched by the spring urged latch arm 61. Detent arm 70 also restores to its original, solid line position. The trolley 26 proceeds under the drive of chain 16 about the switch track section 18 into position to be properly engaged by a feed dog 38 on the advancing main track drive chain 39, as timed by the joint action of signal station 12 and kick feed control unit 14.

The invention also affords a detail of improvement in regard to the conveyor track structure 10 and 11 and the switch tongue 22, whereby the latter is firmly sustained vertically and protected against springing under the very considerable load of a weight-bearing trolley 26 passing over the switching zone at the point of convergence of the arcuate branch track segment 18 with the main track 10. Reference should be made to Figs. 7 and 8 for structural features of the arrangement.

It is seen by reference to these figures that the inner track section, designated 18', of the arcuate track segment 18 and the outer track section 10' adjacent the switch are provided with elongated apertures 92, 93, respectively, in their mutually facing vertical web portions 94. The entrance switch tongue 22 is pivoted, at 23, to the generally triangular connector casting 24 by means of vertically spaced ball bearings 95 and the tongue 22 is connected by an integral hub 96 to the pivot 23 which turns in these bearings, being received in a forwardly opening forked recess of the connector 24. Forwardly of the convergent-sided nose 97 of the connector, and horizontally flush therewith, the tongue 22 has an upwardly offset, elongated surface 97' which constitutes a trolley bearing track surface of the tongue. The tongue is then offset downwardly from the surface, terminating in a downwardly offset bearing nose 98 which extends substantially forwardly of the surface 97'. The lower edge of the bearing nose 98 is in the horizontal plane of the bottom of the elongated track section slots 92, 93, and the bearing portion is receivable in these slots in the alternate positions of the switch tongue 22, as shown in Figs. 7 and 8.

Support is therefore given to the tongue 22 in sustaining the trolley as its load bearing rollers 28 pass from the main or branch tracks 10 and 11 across the tongue track surface 97' and continue on along the main track. Thus the bearings at the pivot 23 are not unduly stressed, and a smooth traverse of the trolley along the track switch zone results.

Referring back to Figs. 1 and 2 of the drawings, it will be noted that a line of appropriate backing rollers 99 is mounted to guide the power chain 39 driving trolley 26 in its travel across the switch zone. Similarly, the transfer conveyor 13 features appropriate chain supporting rollers 100 along its path of travel to sustain the chain 16 in proper position to present its lugs or dogs 47 and 48 between the trolley drive dogs 34 and in mesh with an appropriate drive link of the main power chain 39.

In operation, referring to Fig. 3, let it be assumed that a trolley 26 gravitationally advances along the inclined branch track 11, so that its wheel or roller 30 travels between the vertical webs of the track sections 11', 11" and initially engages the nose 67 of latch arm 61, as illustrated in solid line in Fig. 3. In reaching this position the forward trolley dog 34F yields, allowing it to pass beneath the stop and kick feed arm 55 of lever 52. Roller 30 proceeds beyond this point to its dotted line position of Fig. 3, and in doing so trips the latch arm 61 to dotted line position. The trailing trolley dog 34R strikes the rear edge of arm 55, as also indicated in dotted line and the trolley and its dogs may then rebound to the solid line position, as does the trolley guide roller 30. However, the passage of the roller 30 into transverse alignment with the latch nose 67 has caused the latch arm 61 to be swung against the force of its spring 65 from the solid line position to the dotted line position of Fig. 1. This causes latch arm 61 to release the latch arm 56 of lever unit 52 and the unit instantaneously swings a few degrees into engagement of its kick arm with the detent arm roller 72. The kick feed lever 72 is now in position to be released for a trolley kick feed stroke when a signal is received from the main track station or unit 12.

Now referring to Fig. 6, and assuming that a trolley 26 is being driven by main track chain 39 along the track 10, the depending arm 44 of the unit 12 is struck by the bumper 32 suspended from the trolley as the latter arrives at the signal station 12. Accordingly, the arm 44 is swung forwardly and cams the shaft 36 upwardly, as illustrated and described in the above identified copending application, Serial No. 513,452. This elevates the lug 41 on the arm 35 above the flexible cable connected rod 42. Hence when the extension tappet 40 on arm 35 is struck by the chain dog 38 nothing happens; the resultant swing of arm 35 is ineffective to actuate the rod 42 and the flexible cable 43 connected thereto. Hence, no mechanical signal is transmitted by the cable to the kick lever detent arm 70.

However, in the absence of a trolley 26 being pushed by the main driving chain dog 38, the depending arm 44 remains stationary, the shaft 36 is not elevated, the lug 41 is left in position to engage rod 42 and shift it axially, and the resultant tensioning of the wire element 81 of flexible cable 43, when dog 38 strikes tappet 40, causes its connected link 82 to swing the detent arm 70 counterclockwise, from the solid line position of Fig. 3 to the dotted line position. This releases lever unit 72, and it is swung clockwise by the power spring 57.

The arm 55 of lever 72 imparts a kick stroke to the forward trolley dog 34F in swinging to the dotted line position of the lever. Simultaneously, the swing of the lever causes the lever extension arm 54, through connecting rod 88, to swing the reset arm 86 from its solid line position of Fig. 3 to the dotted line position. Thus it stops the kick-fed trolley 26 upon engagement by the trolley guide roller 30 with the reset arm 86, with the roller 30 in the forward dot-dash position of Fig. 3.

The trolley is now located properly to be engaged by an advancing lug 48 of the transfer conveyor chain 16, and the corresponding position of the trolley dog 34F (as shown in dot-dash line in Fig. 3) is the position at which that dog is picked up by the switch transfer chain lug 48 to advance the trolley 26 around the switch track section 18.

As the switch conveyor chain dog 48 picks up the trolley 26 in the manner described, the forward trolley movement causes the trolley guide roller 30 to swing the reset arm 86 from the dotted line to the solid line position of Fig. 3. This resets the kick feed lever 52, as described, and adjacent the end of the lever's counterclockwise movement the roller 72 of spring urged detent arm 70 rides over the forward face of the lug 75 on arm 52, until halted by the fixed stop lug 78. A slight continued counterclockwise movement of the lever 52 under the reset action of arm 86 causes the end of the latch arm 56 of the lever 52 to pass the shoulder 62 of the latch arm 61. Coil spring 65 immediately swings the arm 61 counterclockwise to its solid line lever latching position. The parts of the kick feed unit 14 are now reset for a succeeding operation.

The action of the improved construction at the switch tongue 22 has been fully set forth above and needs no further description.

Figs. 9 through 13 of the drawings illustrate a further modification and refinement of the principles of the invention as described in reference to Figs. 1 through 8. In this form a trolley 26 is also held out of position for driving engagement by the transfer conveyor 16 until a proper signal is received from the main track signal station 12, indicating an unoccupied trolley driving conveyor dog 38 at that station, and a further signal as to a trolley present in approximate condition to be picked up by the transfer conveyor 16.

The two arrangements differ in that in the modification of Figs. 1 through 8 a branch track kick feed unit 14 is tentatively tripped by the arrival of a trolley adjacent the transfer chain 13, but prior to entry into the path of travel of the dogs 48 of the latter; whereas in the embodiment of Figs. 9 through 13 the trolley arrives in actual position to be picked up by a transfer chain lug 48, but the latter is prevented from doing so. This is due to the fact that the trolley dogs 34 alone are held in an inoperative, depressed position on the trolley out of the path of the conveyor lugs 48. They are restored to operative position only when a signal is received from the main track signal station 12, in response to an unoccupied lug 38 passing that station.

However, it will be appreciated that the principle of operation is fundamentally the same in both forms. In both, a trolley adjacent the transfer chain is put in operative relation to the latter, whether by the kick feed operation of Figs. 1 through 8 or the trolley dog restoring operation of Figs. 9 through 13, only when a proper signal is received from the main track signal station 12. An advantage of the form of Figs. 9 through 13 lies in the fact that, even though unoccupied trolley drive lugs 38 are successively passing the main track signal station and originating signals there, the operation of the entrance switch unit of Figs. 9 through 13 is unfailingly delayed until a trolley actually arrives in proper position on the branch track 11 to be picked up by the transfer conveyor chain 16. Then, and then only, are the branch track trolley dogs 34 restored to position to be engaged by the next advancing transfer conveyor dog 48.

Many of the provisions for mounting the entrance switch unit of Figs. 9 through 13, generally designated 105, as well as the transfer conveyor 13, etc., are practically identical to those appearing in Figs. 1 through 8. Accordingly, in order to simplify the disclosure, repeated illustration and description of the structure and operation of such parts will be dispensed with. Corresponding elements and relationships will be indicated by corresponding reference numerals. It is also to be understood that in the embodiments of Figs. 9 through 13, as well as in other embodiments to be later described, the transfer conveyor chain 16 has a positive driven engagement with the main power conveyor, so that the respective trolley engaging and advancing dogs of the conveyors are in accurately timed relation to one another. This enables the dogs of the main conveyor to be positioned in a relatively close longitudinal spacing, with increased material handling speed and capacity of the system as a result.

As best appears in Figs. 9 and 10, an elongated control lever 106 of horizontally and vertically flanged section is mounted to swing about a vertical axis on the overhead conveyor frame work adjacent one side of the branch track 11. To this end an upright pivot pin 107 (Fig. 10) is journaled in vertically spaced, lateral brackets 108 and the lever 106 is provided with a hub or boss 109 which is secured on the pivot pin 107 between the brackets 108. A rearwardly extending lever reset arm 110 (having the same function as the reset arm 86 of the first embodiment) is also secured to the pivot pin 107, so as to swing as a unit with lever 106. The rearmost extremity of the reset arm 110 operates through an elongated opening 111 in the web of the adjacent trolley track section 11', as in the first form.

A relatively wide horizontal flange 112 projects from the lever 106 over the branch trolley track 11, in the operative position of the lever shown in solid line in Fig. 9. This flange inclines gradually rearwardly and upwardly at 113, and it is guided by a tongue extremity 114 thereof swinging horizontally between fixed parallel guide ways 115 at the top and bottom thereof. A latch dog 116 is welded to the lever 106 adjacent its flange portion 113, for a purpose to be described.

A coil tension spring 117 is connected between the lever 106 and a fixed, though adjustable, anchor 118, this spring urging the lever 106 from its operative, solid line position of Fig. 9 to the inoperative or release position indicated in dotted line in that figure.

The lever 106 has a stop roller 120 journaled beneath its horizontal flange 112 to rotate freely about a fixed vertical axis. For coaction with this roller, each trolley 26 is provided with a forwardly facing front bumper 121, which, as best shown in Fig. 9, has a curved forward impact nose tangent with the lever stop roller 120, when it contacts the latter in the operative position of lever 106, at a force line extending through the axis of the stop roller 120 and the pivotal axis of the lever at pin 107. In this way insurance is had that the lever 106 will never be struck by the trolley in a way to exert rotative force thereon.

With the foregoing arrangement, and with the parts in the solid line positions of Fig. 9, a trolley 26 approaching the transfer unit 105, the trolley drive dogs 34 will engage the underside of the cam inclination portion 113 of lever 106 and will be cammed by the latter to the depressed position shown in Fig. 10. In this position they are held by lever flange 112 below the horizontal path of travel of the drive dogs 48 of transfer chain 16. Hence the trolley 26 will remain in the position at which it is halted by impact of its bumper 121 with lever stop roller 120 until appropriate signals have been received at the unit 105 from the main track signal station 12, as well as from a further branch track signal station 123 (Fig. 9) located adjacent lever 106.

In this connection, the functions of the associated signal station 123 and stop lever 106 are equivalent to those of the kick feed unit 14 of Figs. 1 through 8, in that a signal is imparted at the station 123 as the result of the engagement with a pivoted arm 124 of station 123 of an upstanding lug 125 fixed on the bumper 32 of a trolley 26, in the arrival of the latter at signal station 123.

The lever 106 is held in the operative position of Figs. 9 and 10 by means of a latch device which is generally designated by the reference numeral 126. Structural details of this device appear in Figs. 11 and 12 of the drawings, which should be considered in conjunction with Figs. 9 and 10.

The device 126 takes the form of a primary latch or catch arm 128 which is mounted by a bushing 129 for pivotal movement about a horizontal stem or rod 130 anchored at its opposite ends in brackets 131 fixedly supported by the superstructure of the conveyor. A spring device 132 acts between the latch arm 128 and a fixed abutment 133 on bracket 131 to urge the catch 128 clockwise as shown in Fig. 11. As so urged, a lip or shoulder 134 on the catch 128 extends downwardly over the projecting latch lug 116 on lever 106, and thus normally restrains the lever 106 from movement by its actuating spring 117. In this condition of the parts the lever 106 is in the solid line position of Fig. 9.

In accordance with the improvement of the modification of Figs. 9 through 13, despite the initiation of signals at the main track signal station 12, resulting in the tensioning of the flexible cable connection 43, insurance is had that the lever 106 will never be released by the catch 128 in response thereto, until a trolley is actually present at branch track signal station 123, and has tripped the signal arm 124. Thus, the entrance switch mechanism 105 is unresponsive to any movement of the conveyor controlled tappet 40 at signal station 12 until it is released by the latch unit 126 to go into operation. Moreover, catch arm 128 of this unit can never be released from lever 106 until the tappet 40 is in its unactuated or initial position awaiting the arrival of an empty trolley drive conveyor actuating dog 38 at the main track signal station 12.

To the foregoing ends, the latch unit 126 is provided with a secondary control arm 136 mounted by a bushing 137 for oscillation above the stem or rod 130, in spaced relation to catch arm 128. Adjacent its free end the secondary control arm 136 is connected to the flexible cable 43 from signal station 12. On the opposite side of its pivot, control arm 136 receives a flexible cable 138 paralleling the pivot axis, which cable leads to arm 136 from the branch track signal station 123. It is tensioned when the signal arm 124 of that station is engaged and actuated by the upstanding lug 125 of a trolley bumper.

The arm 136 and its mounting bushing 137 have axial sliding movement along stem 130 under the influence of cable 138, and a coil spring 139 encircling rod 130 and interposed between the primary and secondary control arms 128, 136, respectively, opposes such sliding movement. Secondary arm 136 may be urged clockwise, as viewed in Fig. 11, by a spring similar to the spring 132.

It carries a coupling pin 140 which is resiliently mounted for axial sliding movement in a centrally apertured cylindrical, cup-like guide 141 mounted by the arm 136. A coil spring 142 encircling the inner end of pin 140 acts against an enlarged shoulder 143 thereon to urge the latter outwardly, i. e., toward primary or catch arm 128. The tension of spring 142 may be adjusted by manipulation of a nut 144 threaded on the stem 140. The catch arm 128 is provided with a socket aperture 145 radially equidistant outwardly, in reference to coupling pin 140, from the axis of rotation of the two arms.

With the arrangement described, it is evident that though secondary control arm 136 is responsive, rotationwise, to cable signals from main track signal station 12, in the axially spaced position of the arms 128 and 136 shown in Fig. 12, it is quite ineffective in respect to unlatching of lever 106. However, upon arrival of a trolley adjacent the branch track signal station 123, with consequent actuation of signal station arm 124, the branch track signal cable 138 is tensioned. This causes secondary arm 136 to be shifted downward, as viewed in Fig. 12. Assuming that the coupling pin 140 is at such time out of axial alignment with the socket 145 of arm 128, the latch pin spring 142 will simply be compressed and pin 140 will ride the adjacent side surface of arm 128.

Once the arm 136 restores the axial alignment, due to return of the signal station tappet 40 to unactuated position, the pin 140 snaps down into socket 145, and upon the next arrival of an empty trolley advancing dog 38 at signal station 12, the ensuing actuation of the latter causes cable 43 to be tensioned. This may take place after or simultaneously with the arrival of a branch track trolley 26 at station 123. Catch arm 128 then swings as a unit with secondary arm 136, disengaging the catch shoulder 134 from the lever lug 116. Actuating spring 117 then snaps lever 106 from the solid line operative position to the inoperative or release position in dotted line.

It is seen that regardless of any operation of the signal station 12, the control mechanism keeps the trolley drive dogs 34 out of the path of the transfer conveyor lugs 48 until the exact conditions exist for proper timed transfer of a trolley back into the main track 10. The action is the equivalent of the kick feed action of Figs. 1 through 8, but more foolproof.

As indicated in Fig. 10, the branch track structure 11 carries a dependent, gravitationally responsive rebound stop dog 146, which acts in the conventional manner to prevent a trolley 26 advancing into the operating zone of the branch track signal station 123 from rebounding excessively after its bumper 121 strikes the lever carried stop roll 120.

The embodiments of the invention shown in Fig. 14 through 18, on the one hand and Figs. 19 and 20 on the other, accomplish the same general type of control as the forms of Figs. 1 through 8 and Figs. 9 through 13, but by bodily and non-rotatively shifting a trolley 26, upon its arrival at the branch track signal station out of the path of transfer conveyor dogs 48, rather than by temporarily halting rolling of the trolley and then feeding it longitudinally into the path of a transfer conveyor chain dog (Figs. 1 through 12), or by disabling the trolley for engagement by such dog by depressing the trolley's driving dogs 34 (Figs. 9-13). In the form of Figs. 14 through 18 the bodily shift of the trolley is in the horizontal direction; while in the form of Figs. 19 and 20 it is in a vertical plane.

Referring first to Figs. 14 through 18, Fig. 14 shows a branch track control unit similar in its operation to the latching control unit 126 of Figs. 9 through 13, hence designated by the same reference numeral. The control unit 126 is appropriately mounted rigidly on a bracket or like support 147 carried by the superstructure of the conveyor apparatus.

As in the embodiment of Figs. 9 through 13, the secondary control arm 136 of the unit 126 is connected at 43 to the signal cable of signal station 12, and is connected at 138 to the cable of branch track signal station 123. However, as adapted in the form of Figs. 14 through 18, the primary latch or catch arm 128 has releasable latching engagement with a latch bar 148 carried by a control and reset lever 149, whose rear extremity extends into the path of trolleys advancing on the branch track, in the same way as the extension 110 of lever 106 (Figs. 9 through 13) and the reset arm 86 of the form of Figs. 1 through 8. It is similarly actuated by the guide roll 30 of a trolley departing along the branch track segment 18.

The lever 149 provides actuation for a tracklike trolley positioning unit which is generally designated by the reference numeral 150. It is the function of this unit, through the agency of the further control unit 126, to halt an advancing trolley at a branch track signal station (not shown, but corresponding to station 123 of Figs. 9 through 13) by holding the trolley in a laterally and horizontally displaced, misaligned relation to the track sections 11' of branch track 11 proper, until properly coordinated signals are received from signal stations or units 12 and 123 to make the units 126 and 150 operative. This results in a return shifting of the trolley 26 by the positioning unit 150 back into normal alignment of its guide and track rollers 30 and 28 with the forward continuation of branch track 11 proper. The trolley then proceeds in properly timed relation to an unoccupied main track conveyor dog 38, to be picked up by the latter and advanced along the main track section 10.

To the foregoing ends, the unit 150 includes a pair of track sections 152 spaced in correspondence with the spacing of the branch track sections 11', and which are individually pivoted at 153 to the latter, the branch track 11 being interrupted adjacent the branch track signal station to receive track sections 152.

The sections 152 are coupled for horizontal movement as a unit by a forward, yoke-like floating frame work 154. This includes spaced pairs of parallel, upright channel members 155, a connecting upper cross piece 156 and lower transverse bars 157, 158 rigidly connected to the respective trolley positioning track sections 152 adjacent the free or rearward extremity of the latter. Guide rollers 159 journaled in the respective bars 157 are supported for rolling movement on fixed transverse ways 160 carried by the superstructure of the apparatus.

A coil tension spring 161 anchored on a fixed piece 162, is connected at its other end to a bracket 163 secured to the reset lever 149. Lever 149 is rigidly secured to the floating yoke 154 of the control unit 150. Accordingly, spring 161 urges the yoke 154 and track sections 152 to swing in a counterclockwise direction, as viewed in Fig. 14, about the respective positioning track pivots 153.

When latch dog 148 is released by primary arm 128 in conjunction with signals received by control unit 126, spring 161 will then urge yoke 154 and track sections 152 to swing in a counterclockwise direction about track pivot 153. This will bring the track sections 152 into alignment with the respective sections of branch track 11. In this position trolley 26 is ready to advance into the main line upon engagement with transfer conveyor lug 48. As the trolley 26 is being advanced into the main line, unit 150 is reset (out of alignment) by the movement of guide roller 30 past the reset lever 149. Positioning unit 150 is then ready to receive another branch track trolley 26.

Inasmuch as the horizontal swinging movement of the yoke 154 in the manner described will be accompanied by a slight lateral relative shift movement of the forward yoke uprights 155, provision is made to accommodate this slight movement in the form of small leaf hinges 164 interposed between the uprights 155 of each forward pair.

As best illustrated in Fig. 18, a fixed stop arm 166 depends from the supporting structure of the conveyor apparatus in the zone of the positioning unit 150. This arm carries a stop finger 167 which, in the solid line position of the parts shown in Fig. 18 (as well as in Figs. 14 and 16) is interposed in the path of the trolley drive dogs 34, with the track sections 152 latched by the engagement of arm 128 with latch bar 148 in an offset or misaligned relation to the branch track sections. Stop finger 167 thus halts the trolley from advancing onto unit 11 at the branch track signal station 123.

With the parts so positioned, the secondary control arm 136 of control unit 126 is automatically shifted to the right, as viewed in Fig. 14, by the branch track cable 138. When the coupling pin 140 of secondary arm 136 aligns with socket 145 of primary arm 128, the unit 126 is set to operate the unit 150 the next time an empty main track conveyor lug or dog 38 trips the main track signal station 12. This releases the arm 149 and yoke 154 to swing counterclockwise under the force of spring 161, and thus aligns the positioning track sections 152 with the forward branch track sections 11'. The trolley 26 is now positioned and free to proceed in properly timed relation for pick-up by the main power conveyor 39, upon being engaged by a transfer conveyor lug 48.

In the embodiment illustrated in Figs. 19 and 20, the action is similar to that of Figs. 14 through 18, with the exception that shifting movement of the trolley positioning track is vertical, rather than horizontal. Thus, a track control unit 168 is provided with a yoke or frame 169 made up of pairs of forward and rearward uprights 170 braced by suitable means, including horizontal and inclined cross pieces 171, 172, and supporting track sections 173 at the lower ends of the frame 169. The latter is pivoted on a horizontal axis 174 to the rearmost of the longitudinally interrupted branch track sections 11', for swinging from the solid line to the dotted line positions of Fig. 20, and vice versa. In the depressed solid line position, the trolley dogs 34 are dropped beneath the path of the advancing transfer conveyor lugs 48, and the forward trolley track wheels or rollers 28 abut the adjacent fixed branch track sections 11' to halt the trolley 26.

The frame 169 may be elevated to restore the track sections 173 to horizontal alignment with the remainder of the branch track 11 by means such as the control unit 126 of the previously described figures, suitably operated in conjunction with a trolley actuated branch track signal station or unit, as described. As illustrated in Fig. 20, this may be effected if desired, through the intervening agency of a hydraulic cylinder 176 carried on a fixed pivot at 177, with its plunger 178 pivoted at 179 to the frame 169. The control unit 126 may be employed to control the operation of a spool or like valve (not shown) which in turn governs the hydraulic operation of the cylinder 176 in an obvious manner.

It is seen that the invention provides various alternatives of an entrance switch mechanism for a power and free conveyor system which have in common the feature and advantage that the proper timing of the pick-up of a branch track trolley is accomplished unfailingly, with no possibility of jamming upon entry into the main track section. This is done by controlling the positioning (speaking functionally or operationally) of the trolley or some component thereof in relation to a continuously traveling transfer conveyor so as to prevent pick-up of the trolley by the last named conveyor until certain conditions obtain. The trolley is then restored to a position for pick-up in response to coordinated signals from main and branch track signal units or stations only when such conditions exist, and a jam-free entry of the trolley onto the main track ensues.

Of basic importance in the invention is the fact that all of the switching, transfer and control instrumentalities of the apparatus derive their power from a common source, i. e., the main powered conveyor chain, through the caterpillar drive connection of the transfer chain thereto.

It is evident that the result is the same in all forms, though the restoration is accomplished in the first embodiment by bodily rolling the trolley forwardly to position for engagement by the transfer conveyor, in the second by disabling drive dogs of the trolley from engagement by the transfer conveyor, and in the third and fourth by laterally displacing the trolley as it arrives on separate control or positioning switch track sections. Accordingly, the invention is to be construed broadly, other than as specifically limited in the appended claims. In particular, when reference is made to the positioning or locating of the trolley in reference to the transfer conveyor, it is the intent that a positioning of only a component thereof, as its drive dog, is comprehended.

In each and every one of the modifications, there is an absolute coordination of the speeds of all parts, main conveyor, transfer conveyor, control assembly, etc. Motors likely to operate at speeds at variance with the conveyor speed are dispensed with. The principles of the invention are applicable to conveyor systems which run into thousands of feet of conveyor travel, with many branch tracks and necessary switching provisions, at absolute minimum cost due to the elimination of motors, electrical, pneumatic or hydraulic controls, etc., and with absolute reliability of operation.

What we claim as our invention is:

1. A conveyor system comprising a main trolley track, power driven members traveling adjacent and in the direction of said main track to advance trolleys therealong, a branch track converging relative to said main track in a predetermined zone, and an entrance mechanism to effect a properly timed advance and entry of a trolley on said branch track to said zone of convergence of said main and branch tracks, for further advance on the main track by one of said trolley advancing members, said mechanism comprising a transfer conveyor adjacent said branch track continuously driven in convergent relation toward said path of travel of said trolley advancing members of the main track, said transfer conveyor having means engageable with a part of a trolley on said branch track to transfer said trolley to said main track for said engagement by one of said trolley advancing members, a control device located adjacent to and to one side of said branch track and transfer conveyor, said device having means to engage and halt a trolley travelling on said branch track and temporarily prevent engagement of said part of said trolley with said transfer conveyor means, a signal device disposed adjacent and to one side of said main track at a point passed by said trolley advancing members of the main track in approaching said zone of convergence of said tracks, said signal device being operable by said trolley advancing members and by trolleys traveling on said main track toward said zone of convergence, and means operatively connecting said signal and control devices to one another, said connecting means being responsive to operation of said signal device to cause said trolley engaging and halting means of said control device to temporarily prevent said engagement of said part of a trolley and said transfer conveyor means, or to permit said last named engagement, depending respectively upon whether said signal device is operated by both a trolley advancing member and a trolley traveling on said main track, or whether said signal device is operated by a trolley advancing member alone.

2. A conveyor system in accordance with claim 1, in which said trolley part is a dog for engagement by said transfer conveyor means and by a main track trolley advancing member to drive said trolley on the respective tracks, said means of said control device including a member to mechanically engage and halt a branch track trolley, and a member acting to relatively move said dog and transfer conveyor means out of position for engagement with one another.

3. A conveyor system in accordance with claim 1, in which said trolley part is a dog movably mounted thereon for engagement by said transfer conveyor means and by a main track trolley advancing member to drive said trolley on the respective tracks, said means of said control device including a member to mechanically engage and halt a branch track trolley, and a member acting to relatively move said dog and transfer conveyor means out of position for engagement with one another, said last named member engaging said dog to move the dog out of the path of movement of said transfer conveyor means.

4. A conveyor system comprising a main trolley track, an endless, continuously driven main power conveyor having members traveling adjacent and in the direction of said main track to advance trolleys therealong, a branch track converging relative to said main track in a predetermined zone, and an entrance mechanism to effect a properly timed advance and entry of a trolley on said branch track to said zone of convergence of said main and branch tracks, for further advance on the main track by one of said trolley advancing members, said mechanism comprising a transfer conveyor adjacent said branch track in driving engagement with said main conveyor and continuously driven by the latter in convergent relation toward said path of travel of said trolley advancing members of the main track, said transfer conveyor having means engageable with a part of a trolley on said branch track to transfer said trolley to said main track for said engagement by one of said trolley advancing members, a control device located adjacent to and to one side of said branch track and transfer conveyor, said device having means to engage and halt a trolley traveling on said branch track and temporarily prevent engagement of said part of said trolley with said transfer conveyor means, a signal device disposed adjacent and to one side of said main track at a point passed by said trolley advancing members of the main track in approaching said zone of convergence of said tracks, said signal device being operable by said trolley advancing members and by trolleys traveling on said main track toward said zone of convergence, and means operatively connecting said signal and control devices to one another, said connecting means being responsive to operation of said signal device to cause said trolley engaging and halting means of said control device to temporarily prevent said engagement of said part of a trolley and said transfer conveyor means, or to permit said last named engagement, depending respectively upon whether said signal device is operated by both a trolley advancing member and a trolley traveling on said main track, or whether said signal device is operated by a trolley advancing member alone.

5. A conveyor system in accordance with claim 4, in which said trolley part is a dog for engagement by said transfer conveyor means and by a main track trolley advancing member to drive said trolley on the respective tracks, said means of said control device including a member to mechanically engage and halt a branch track trolley, and a member acting to relatively move said dog and transfer conveyor means out of position for engagement with one another, said dog, transfer conveyor means and main track trolley advancing members traveling in substantially the same horizontal plane in approaching said zone of convergence of said tracks.

6. A conveyor system in accordance with claim 4, in which said trolley part is a dog for engagement by said transfer conveyor means and by a main track trolley advancing member to drive said trolley on the respective tracks, said means of said control device halting a branch track trolley out of position for engagement by said transfer conveyor means, and comprising a kick member moved in response to actuation of said control device through said connecting means to mechanically engage said dog and forward the halted trolley into position for engagement by said transfer conveyor means.

7. A conveyor system comprising a main trolley track, driven members traveling adjacent and in the direction of said main track to advance trolleys therealong, a branch track converging relative to said main track in a predetermined zone, and an entrance mechanism to effect a properly timed advance and entry of a trolley on said branch track to said zone of convergence of said main and branch tracks, for further advance on the main track by one of said trolley advancing members, said mechanism comprising a transfer conveyor adjacent said branch track continuously driven in convergent relation toward said path of travel of said trolley advancing members of the main track, said transfer conveyor having means engageable with a part of a trolley on said branch track to transfer said trolley to said main track for said engagement by one of said trolley advancing members, a control device located adjacent to and to one side of said branch track and transfer conveyor, said device having means to engage and halt a trolley traveling on said branch track and temporarily prevent engagement of said part of said trolley with said transfer conveyor means, a signal device disposed adjacent and to one side of said main track at a point passed by said trolley advancing members of the main track in approaching said zone of convergence of said main and branch tracks, said signal device having members respectively engageable and operable by said main track trolley advancing members and by trolleys traveling on said main track toward said zone of convergence, and means operatively connecting said signal and control devices to one another, said connecting means being selectively responsive to operation of said members of said signal device to cause said trolley engaging and halting means of said control device to temporarily prevent said engagement of said part of a trolley and said transfer conveyor means, or to permit said last named engagement, depending respectively upon whether both of said members of said signal device are engaged and operated, respectively, by a trolley advancing member and by a trolley traveling on said main track, or whether only one of said members of said signal device is engaged and operated by a trolley advancing member alone.

8. A conveyor system comprising a main trolley track, an endless main power conveyor having driven members traveling adjacent and in the direction of said main track to advance trolleys therealong, a branch track converging relative to said main track in a predetermined zone, and an entrance mechanism to effect a properly timed advance and entry of a trolley on said branch track to said zone of convergence of said main and branch tracks, for further advance on the main track by one of said trolley advancing members, said mechanism comprising a transfer conveyor adjacent said branch track in driving engagement with said main conveyor and continuously driven by the latter in convergent relation toward said path of travel of said trolley advancing members of the main track, said transfer conveyor having means engageable with a part of a trolley on said branch track to transfer said trolley to said main track for said engagement by one of said trolley advancing members, a control device located adjacent to and to one side of said branch track and transfer conveyor, said device having means to engage and halt a trolley traveling on said branch track and temporarily prevent engagement of said part of said trolley with said transfer conveyor means, a signal device disposed adjacent and to one side of said main track at a point passed by said trolley advancing members of the main track in approaching said zone of convergence of said main and branch tracks, said signal device having members respectively engageable and operable by said main track trolley advancing members and by trolleys traveling on said main track toward said zone of convergence, and means operatively connecting said signal and control devices to one another, said connecting means being selectively responsive to operation of said members of said signal device to cause said trolley engaging and halting means of said control device to temporarily prevent said engagement of said part of a trolley and said transfer conveyor means, or to permit said last named engagement, depending respectively upon whether both of said members of said signal device are engaged and operated, respectively, by a trolley advancing member and by a trolley traveling on said main track, or whether only one of said members of said signal device is engaged and operated by a trolley advancing member alone.

References Cited in the file of this patent

UNITED STATES PATENTS

| | | |
|---|---|---|
| 1,865,788 | Raymond | July 5, 1932 |
| 1,875,966 | Webb et al. | Sept. 6, 1932 |
| 1,917,836 | Haddlesay | July 11, 1933 |
| 2,057,131 | Barton et al. | Oct. 13, 1936 |
| 2,161,388 | Rosenthal | June 6, 1939 |
| 2,318,180 | Morse | May 4, 1943 |
| 2,344,155 | McBride et al. | Mar. 14, 1944 |
| 2,527,244 | Culver | Oct. 24, 1950 |
| 2,612,847 | Burrows | Oct. 7, 1952 |
| 2,635,555 | Hansson | Apr. 21, 1953 |
| 2,679,810 | Schutt | June 1, 1954 |
| 2,684,039 | King | July 20, 1954 |
| 2,688,936 | Brooks | Sept. 14, 1954 |
| 2,741,190 | King | Apr. 10, 1956 |
| 2,782,727 | King | Feb. 26, 1957 |
| 2,812,724 | King | Nov. 12, 1957 |
| 2,845,034 | Harrison | July 29, 1958 |
| 2,853,955 | Bishop and Klamp | Sept. 30, 1958 |

FOREIGN PATENTS

| | | |
|---|---|---|
| 742,488 | Great Britain | Dec. 30, 1955 |